(12) United States Patent
Lee

(10) Patent No.: US 11,637,311 B2
(45) Date of Patent: Apr. 25, 2023

(54) SEPARATOR, LITHIUM SECONDARY BATTERY INCLUDING SEPARATOR, AND MANUFACTURING METHOD THEREOF

(71) Applicant: LG Chem, Ltd., Seoul (KR)

(72) Inventor: Joo-Sung Lee, Daejeon (KR)

(73) Assignee: LG Chem, Ltd.

( * ) Notice: Subject to any disclaimer, the term of this patent is extended or adjusted under 35 U.S.C. 154(b) by 389 days.

(21) Appl. No.: 16/490,178

(22) PCT Filed: Jan. 31, 2019

(86) PCT No.: PCT/KR2019/001400
§ 371 (c)(1),
(2) Date: Aug. 30, 2019

(87) PCT Pub. No.: WO2019/151812
PCT Pub. Date: Aug. 8, 2019

(65) Prior Publication Data
US 2020/0006737 A1    Jan. 2, 2020

(30) Foreign Application Priority Data
Jan. 31, 2018  (KR) ........................ 10-2018-0012301

(51) Int. Cl.
*H01M 10/05*    (2010.01)
*H01M 50/48*    (2021.01)
*H01M 50/40*    (2021.01)
*H01M 10/0525*  (2010.01)
*H01M 50/403*   (2021.01)
*H01M 50/489*   (2021.01)
*H01M 50/417*   (2021.01)
*H01M 50/457*   (2021.01)

(52) U.S. Cl.
CPC ..... *H01M 10/0525* (2013.01); *H01M 50/403* (2021.01); *H01M 50/417* (2021.01); *H01M 50/457* (2021.01); *H01M 50/489* (2021.01)

(58) Field of Classification Search
None
See application file for complete search history.

(56) References Cited

U.S. PATENT DOCUMENTS

| | | | |
|---|---|---|---|
| 5,591,539 | A | 1/1997 | Degen et al. |
| 2011/0144220 | A1 | 6/2011 | Krupinski |
| 2011/0178198 | A1 | 7/2011 | Backer et al. |
| 2014/0106236 | A1 | 4/2014 | Kwon et al. |
| 2014/0272663 | A1 | 9/2014 | Dekel et al. |
| 2015/0056492 | A1* | 2/2015 | Huang ............... H01M 50/403 521/62 |
| 2016/0087306 | A1 | 3/2016 | Lee et al. |
| 2016/0126518 | A1 | 5/2016 | Park et al. |
| 2017/0133652 | A1 | 5/2017 | Jang et al. |

FOREIGN PATENT DOCUMENTS

| | | | | |
|---|---|---|---|---|
| CN | 104241571 | A | 12/2014 | |
| CN | 104425790 | A | 3/2015 | |
| CN | 105576172 | A | 5/2016 | |
| JP | H02147647 | A | 6/1990 | |
| JP | H03059947 | A | 3/1991 | |
| JP | H06325749 | A | 11/1994 | |
| JP | H07112029 | A | 5/1995 | |
| JP | 2768745 | B2 | 6/1998 | |
| JP | 2002-110126 | A * | 4/2002 | ............ H01M 10/05 |
| JP | 2002110126 | A | 4/2002 | |
| JP | 2005272542 | A | 10/2005 | |
| JP | 20064732 | A | 1/2006 | |
| JP | 2011526313 | A | 10/2011 | |
| JP | 5617609 | B2 | 11/2014 | |
| JP | 2015519686 | A | 7/2015 | |
| JP | 2017-203145 | A * | 11/2017 | ................ C08J 9/00 |
| JP | 2017203145 | A | 11/2017 | |
| JP | 2017216052 | A | 12/2017 | |
| KR | 101156961 | B1 | 6/2012 | |
| KR | 20130059783 | A | 6/2013 | |
| KR | 20150021557 | A | 3/2015 | |
| KR | 20160052332 | A | 5/2016 | |
| KR | 20160129580 | A | 11/2016 | |
| KR | 20160129583 | A | 11/2016 | |
| KR | 20170053010 | A | 5/2017 | |
| KR | 101747865 | B1 | 6/2017 | |
| WO | 2013154623 | A1 | 10/2013 | |

OTHER PUBLICATIONS

Chinese Search Report for Application No. 201980001331.8, dated Jul. 22, 2021, 3 pages.
Extended European Search Report including Written Opinion for Application No. EP19747781.3, dated Mar. 23, 2020, pp. 1-9.
International Search Report from Application No. PCT/KR2019/001400 dated May 10, 2019, pp. 1-3.
Dent, T. "GPC/SEC Practical Tips and Tricks," Agilent Technologies, Oct. 2011, pp. 1-38, XP055608344. Retrieved from the Internet: URL:https://www.agilent.com/cs/library/slidepresentation/Public/GCC2011-Wksp_GPC_Tips-and-Tricks_Presentation.pdf.

(Continued)

*Primary Examiner* — Maria Laios
*Assistant Examiner* — Angela J Martin
(74) *Attorney, Agent, or Firm* — Lerner David LLP

(57) ABSTRACT

A separator, a method of manufacturing the same, and a lithium secondary battery including the same are disclosed herein. In some embodiments, a separator includes a non-crosslinked polyolefin layer; and a crosslinked polyolefin layer disposed on one surface of the non-crosslinked polyolefin layer and having at least one crosslinking bond represented by the following Chemical Formula 1, wherein the separator is configured such that the non-crosslinked polyolefin layer of the separator faces a positive electrode. In some embodiments, a lithium secondary battery includes a positive electrode, a negative electrode and the separator interposed between the positive electrode and the negative electrode. The lithium secondary battery has a high meltdown temperature and shows high oxidation stability under high-voltage/high-temperature environment.

10 Claims, 1 Drawing Sheet

(56) References Cited

OTHER PUBLICATIONS

Ghosh, P. "Polymer Science: Fundamentals of Polymer Science—Molecular Weights of Polymers," Sep. 2006, pp. 1-22, XP055608363. Retrieved from the Internet: URL:http://nsdl.niscair.res.in/jspui/bitstream/123456789/406/2/Molecular%20weights%20of%20polymers.pdf.

* cited by examiner

SEPARATOR, LITHIUM SECONDARY BATTERY INCLUDING SEPARATOR, AND MANUFACTURING METHOD THEREOF

CROSS-REFERENCE TO RELATED APPLICATIONS

The present application is a national phase entry under 35 U.S.C. § 371 of International Application No. PCT/KR2019/001400, filed on Jan. 31, 2019, which claims priority from Korean Patent Application No. 10-2018-0012301, filed on Jan. 31, 2018, the disclosures of incorporated by reference herein.

TECHNICAL FIELD

The present disclosure relates to a separator, a lithium secondary battery including the separator and a method for manufacturing the same.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Such a lithium secondary battery includes a positive electrode, a negative electrode, an electrolyte and a separator. Particularly, it is required for the separator to have insulation property for separating the positive electrode and the negative electrode from each other and high ion conductivity for increasing lithium ion permeability based on high porosity.

In addition, it is required for the separator to have a broad interval between a shut-down temperature and a melt-down temperature so that a lithium secondary battery including the separator may ensure safety.

Methods for reducing the shut-down temperature include a method of cleaving the polymer chain in a separator to generate radicals, or a method of blending a branched polymer having a low melting point with a linear polymer to obtain a separator. Methods for increasing the melt-down temperature include a method of crosslinking a porous polymer substrate.

For example, to carry out the method of crosslinking a porous polymer substrate, an electron beam crosslinking process, a chemical crosslinking process using an initiator or a crosslinking agent, or the like, may be used. However, the electron beam crosslinking process has a disadvantage of significantly high cost for plant and equipment investment and shows a problem in that it cannot increase the melt-down temperature. Meanwhile, in the case of most chemical crosslinking processes, there is a problem in that they cannot increase the melt-down temperature when a polymer chain is crosslinked directly.

Therefore, among such chemical crosslinking processes, the present disclosure uses an aqueous crosslinking process, in which siloxane, or the like, is crosslinked between polymer chains (i.e. polymer chains are not crosslinked directly but crosslinked indirectly by means of siloxane, or the like) in order to accomplish the object of increasing the melt-down temperature. In the case of such an aqueous crosslinking process, an initiator or crosslinking agent is used. When the initiator remains after crosslinking or non-reacted radicals generated during the crosslinking are present, defect sites are present in a porous polymer substrate. As a result, when a lithium secondary battery operates under high-voltage/high-temperature environment, side reactions occur at the interface between the positive electrode and the separator due to oxidation.

DISCLOSURE

Technical Problem

Therefore, the present disclosure is directed to providing a lithium secondary battery including a separator which increases the melt-down temperature of a porous polymer substrate and also has oxidation stability.

Technical Solution

In one aspect of the present disclosure, there is provided a lithium secondary battery according to any one of the following embodiments.

According to the first embodiment, there is provided a lithium secondary battery which includes a positive electrode, a negative electrode and a separator interposed between the positive electrode and the negative electrode, wherein the separator includes: a non-crosslinked polyolefin layer; and a crosslinked polyolefin layer disposed on one surface of the non-crosslinked polyolefin layer and having at least one crosslinking bond represented by the following Chemical Formula 1, and the positive electrode faces the non-crosslinked polyolefin layer of the separator.

According to the second embodiment, there is provided the lithium secondary battery as defined in the first embodiment, which further includes an outermost non-crosslinked polyolefin layer on the other surface of the crosslinked polyolefin layer not facing the non-crosslinked polyolefin layer, and the negative electrode faces the outermost non-crosslinked polyolefin layer.

According to the third embodiment, there is provided the lithium secondary battery as defined in the second embodiment, which further includes, between the crosslinked polyolefin layer and the outermost non-crosslinked polyolefin layer, at least one layer of non-crosslinked polyolefin layer, at least one layer of crosslinked polyolefin layer, or a combination of at least one layer of non-crosslinked polyolefin layer with at least one layer of crosslinked polyolefin layer.

According to the fourth embodiment, there is provided the lithium secondary battery as defined in any one of the first to the third embodiments, wherein the crosslinking bond is derived from an alkoxysilane containing a carbon-carbon double bonded group.

According to the fifth embodiment, there is provided the lithium secondary battery as defined in the first to the forth embodiments, wherein the crosslinked polyolefin layer has a thickness corresponding to 30-95% of the total thickness of the separator.

According to the sixth embodiment, there is provided the lithium secondary battery as defined in the first to the fifth embodiments, wherein the non-crosslinked polyolefin layer has a thickness of 0.3-2.5 μm.

According to the seventh embodiment, there is provided the lithium secondary battery as defined in the first to the sixth embodiments, wherein the non-crosslinked polyolefin layer includes polyethylene alone or a combination of polyethylene with polypropylene, and the content of polypropylene is 0.3-10 wt % based on the total weight of the non-crosslinked polyolefin layer.

According to the eighth embodiment, there is provided the lithium secondary battery as defined in the first to the seventh embodiments, wherein the non-crosslinked polyolefin layer further includes an antioxidant derivative derived from an antioxidant.

According to the ninth embodiment, there is provided the lithium secondary battery as defined in the first to the eighth embodiments, wherein the crosslinked polyolefin in the crosslinked polyolefin layer has a gelling degree of 30-90%.

According to the tenth embodiment, there is provided the lithium secondary battery as defined in the first to the ninth embodiments, which has an open-circuit voltage of 4.25V or more, when it is charged with 4.45V and then stored at 72° C. for 96 hours.

In another aspect of the present disclosure, there is provided a method for manufacturing a lithium secondary battery according to any one of the following embodiments.

According to the eleventh embodiment, there is provided a method for manufacturing a lithium secondary battery, including the steps of: preparing a separator including a non-crosslinked polyolefin layer prepared by using polyolefin having a weight average molecular weight of 50,000-5,000,000 and a diluting agent, and a crosslinked polyolefin layer having at least one crosslinking bond represented by the following Chemical Formula 1 and prepared by using polyolefin having a weight average molecular weight of 50,000-5,000,000, a diluting agent, an initiator and a crosslinking agent; and interposing the separator between a positive electrode and a negative electrode so that the non-crosslinked polyolefin layer of the resultant separator may face the positive electrode.

According to the twelfth embodiment, there is provided the method for manufacturing a lithium secondary battery as defined in the eleventh embodiment, the method including the steps of: preparing a composition for non-crosslinking polyolefin by using polyolefin having a weight average molecular weight of 50,000-5,000,000 and a diluting agent; preparing a composition for crosslinking polyolefin by using polyolefin having a weight average molecular weight of 50,000-5,000,000, a diluting agent, an initiator and a crosslinking agent; forming the polyolefin for non-crosslinking composition and the composition for crosslinking polyolefin into a sheet shape and stretching, to obtain a composite sheet; extracting the diluting agent from the composite sheet to obtain a separator; thermally fixing the separator; carrying out aqueous crosslinking of the separator in the presence of water; and interposing the separator between a positive electrode and a negative electrode so that the non-crosslinked polyolefin layer of the resultant separator may face the positive electrode.

According to the thirteenth embodiment, there is provided the method for manufacturing a lithium secondary battery as defined in the twelfth embodiment, wherein the step of preparing a composite sheet includes: carrying out co-extrusion of the composition for non-crosslinking polyolefin and the composition for crosslinking polyolefin to form a sheet shape and stretching, to obtain a composite sheet including the crosslinked polyolefin layer and non-crosslinked polyolefin layer, wherein the composition for crosslinking polyolefin undergoes crosslinking during the co-extrusion step.

According to the fourteenth embodiment, there is provided the method for manufacturing a lithium secondary battery as defined in the twelfth embodiment, wherein the crosslinking agent is an alkoxysilane containing a carbon-carbon double bonded group.

In still another aspect of the present disclosure, there is provided a separator for a lithium secondary battery according to any one of the following embodiments.

According to the fifteenth embodiment, there is provided a separator for a lithium secondary battery including a positive electrode and a negative electrode, wherein the separator is interposed between the positive electrode and the negative electrode, and the separator includes: a non-crosslinked polyolefin layer; and a crosslinked polyolefin layer disposed on one surface of the non-crosslinked polyolefin layer and having at least one crosslinking bond represented by the following Chemical Formula 1, and the positive electrode faces the non-crosslinked polyolefin layer of the separator.

According to the sixteenth embodiment, there is provided the separator for a lithium secondary battery as defined in the fifteenth embodiment, which further includes an outermost non-crosslinked polyolefin layer on the other surface of the crosslinked polyolefin layer not facing the non-crosslinked polyolefin layer, wherein the negative electrode faces the outermost non-crosslinked polyolefin layer.

Advantageous Effects

The separator according to the present disclosure and lithium secondary battery including the same show improved heat resistance through aqueous crosslinking of polyolefin. Thus, it is possible to provide a lithium secondary battery with improved high-temperature stability.

The separator according to the present disclosure and lithium secondary battery including the same can reduce the shut-down temperature by cleaving a bond in the separator through the generation of radicals during the preparation of the crosslinked polyolefin. As a result of such a reduced shut-down temperature, it is possible to reduce the temperature where pores in the separator are blocked. Thus, it is possible to provide a lithium secondary battery with excellent safety.

The separator according to the present disclosure and lithium secondary battery including the same have a high melt-down temperature and high oxidation stability under high-voltage/high-temperature environment.

In addition, the separator according to the present disclosure and lithium secondary battery including the same have high oxidation stability under high-voltage/high-temperature environment, since the non-crosslinked polyolefin layer of the separator faces the positive electrode.

BEST MODE

Figure 1:
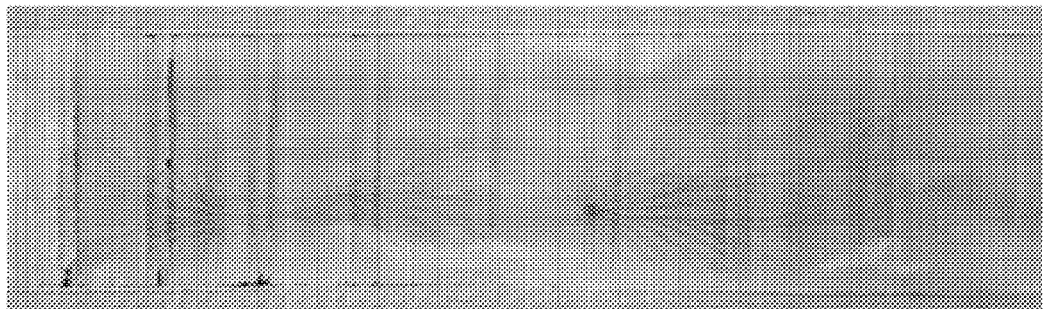
FIG. 1 is a photographic image illustrating a portion of the separator according to Comparative Example 1, facing the positive electrode, after it is stored at 72° C./4.45 V for 72 hours and then disassembled.

Hereinafter, the present disclosure will be described in detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As used herein, the expression 'one portion is connected to another portion' covers not only 'a portion is directly connected to another portion' but also 'one portion is connected indirectly to another portion' by way of the other element interposed between them.

Throughout the specification, the expression 'a part includes an element' does not preclude the presence of any additional elements but means that the part may further include the other elements.

In addition, it will be understood that the terms 'comprises' and/or 'comprising', or 'includes' and/or 'including' when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

In one aspect, there is provided a lithium secondary battery which includes a separator including a crosslinked polyolefin layer having a crosslinking bond, and a non-crosslinked polyolefin layer, wherein the non-crosslinked polyolefin layer faces a positive electrode.

A separator used for a lithium secondary battery shows high safety, when it shows a large difference between the shut-down temperature and the melt-down temperature. When the shut-down temperature is decreased, the temperature where pores in the porous polymer substrate are blocked is reduced, thereby providing a lithium secondary battery with improved safety. When the melt-down temperature is increased, the temperature where the porous polymer substrate itself is molten is increased, thereby preventing rapid ignition. According to the related art, there have been suggested a method of cleaving the polymer chain in a separator to generate radicals in order to reduce the shut-down temperature, or a method of blending a branched polymer having a low melting point with a linear polymer to obtain a separator. There has been also suggested a method of crosslinking a polyolefin substrate to increase the melt-down temperature.

According to the present disclosure, it has been found that when an initiator or crosslinking agent is used to generate radicals in order to reduce the shut-down temperature, and a polyolefin substrate is subjected to aqueous crosslinking in order to increase the melt-down temperature, the crosslinked polyolefin layer faces an electrode under high-voltage/high-temperature environment to cause degradation of the performance of a lithium secondary battery. The present inventors have conducted many studies to solve this problem, and finished the present disclosure. In addition, considering that the performance of a battery is changed depending on which electrode the crosslinked polyolefin layer faces in both electrodes having opposite polarities, we have studied to develop a lithium secondary battery having better performance.

The lithium secondary battery according to an embodiment of the present disclosure is a lithium secondary battery which includes a positive electrode, a negative electrode and a separator interposed between the positive electrode and the negative electrode, wherein the separator includes: a non-crosslinked polyolefin layer; and a crosslinked polyolefin layer disposed on one surface of the non-crosslinked polyolefin layer and having at least one crosslinking bond represented by the following Chemical Formula 1, and the positive electrode faces the non-crosslinked polyolefin layer of the separator:

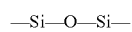  [Chemical Formula 1]

The lithium secondary battery according to an embodiment of the present disclosure may include at least one non-crosslinked polyolefin layer and at least one crosslinked polyolefin layer.

The non-crosslinked polyolefin layer means a polyolefin layer subjected no secondary processing using an initiator or crosslinking agent. The non-crosslinked polyolefin in the non-crosslinked polyolefin layer may be selected from a non-modified polyolefin and modified polyolefin. The modified polyolefin includes a resin having a functional group. Such a functional group will be described hereinafter.

The non-modified polyolefin means a polyolefin not modified with a crosslinking agent or another functional group. Particular examples of the non-modified polyolefin include at least one selected from the group consisting of polyethylene; polypropylene; polybutylene; polypentene; polyhexene; polyoctene, copolymers of at least two of ethylene, propylene, butene, pentene, 4-methylpentene, hexene and octene; and combinations thereof.

The modified polyolefin (except polyolefins containing a peroxide-crosslinking bond or siloxane crosslinking bond) is a polyolefin modified with a functional group. The functional group may include a carboxylate group, acid anhydride group, amino group, or the like. Preferably, the functional group may be a maleate group, epoxy group, amino group, or the like.

The modified polyolefin may use the non-modified polyolefin as a polyolefin before modification.

The polyolefin used for forming the non-crosslinked polyolefin layer may have a weight average molecular weight of 50,000-5,000,000, particularly 100,000-800,000, and more particularly 150,000-350,000. Within the above-defined range, it is possible to provide a separator with desired durability and to minimize deformation of a battery during actual use of the battery, i.e. during repeated swelling/shrinking of the battery after charge/discharge.

The crosslinked polyolefin in the crosslinked polyolefin layer means a polyolefin having at least one crosslinking bond represented by the following Chemical Formula 1 therein. The crosslinking bond is formed by using a crosslinking agent through radical generation.

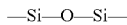 [Chemical Formula 1]

In other words, the crosslinking bond represented by Chemical Formula 1 is formed by a chemical bond between silicon (Si) and polyolefin by means of oxygen (O).

Particularly, the crosslinking bond may be a siloxane crosslinking bond:

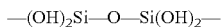 [Chemical Formula 2]

According to an embodiment of the present disclosure, the crosslinking agent may be an alkoxysilane crosslinking agent containing a carbon-carbon double bonded group.

In other words, according to an embodiment of the present disclosure, the crosslinking bond represented by Chemical Formula 1 may be derived from an alkoxysilane containing a carbon-carbon double bonded group.

As used herein, 'aqueous crosslinking' means a reaction in which a crosslinking agent is grafted to polyolefin by using an initiator, crosslinking agent and a crosslinking catalyst, and then a crosslinking bond is formed between polyolefin molecules by water through the crosslinking agent.

Particularly, Si—O—Si crosslinking bond is formed in the reaction, wherein polyolefin is chemically bound to silicon by means of oxygen.

According to an embodiment of the present disclosure, the alkoxysilane containing a carbon-carbon double bonded group is a crosslinking agent by which a silane crosslinking reaction is carried out, is grafted to polyolefin by a carbon-carbon double bonded group (e.g. vinyl group), and functions to crosslink polyolefin through aqueous crosslinking performed by an alkoxy group.

According to an embodiment of the present disclosure, the alkoxysilane containing a carbon-carbon double bonded group may include a compound represented by the following Chemical Formula 3:

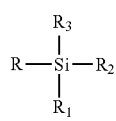 [Chemical Formula 3]

wherein each of $R_1$, $R_2$ and $R_3$ independently represents a C1-C10 alkoxy group or C1-C10 alkyl group, with the proviso that at least one of $R_1$, $R_2$ and $R_3$ represents an alkoxy group; and R represents a vinyl group, acryl group, acryloxy group, methacryloxy group, or a C1-C20 alkyl group, wherein at least one hydrogen atom of the alkyl group is substituted with a vinyl group, acryloxy group, methacryloxy group, or methacryl group.

Meanwhile, R may further include an amino group, epoxy group or isocyanate group.

According to an embodiment of the present disclosure, the alkoxysilane containing a carbon-carbon double bonded group may include vinyltrimethoxysilane, vinyltriethoxysilane, vinyltriacetoxysilane, (3-methacryloxypropyl)trimethoxysilane, (3-methacryloxypropyl)triethoxysilane, vinylmethyldimethoxysilane, vinyl-tris(2-methoxyethoxy)silane, vinylmethyldiethoxysilane, or a combination thereof.

In addition, any initiator may be used, as long as it can generate radicals. Particular examples of the initiator may include benzoyl peroxide, acetyl peroxide, dilauryl peroxide, di-tert-butyl peroxide, cumyl peroxide, hydrogen peroxide, potassium persulfate, or the like. More particularly, examples of the initiator include, but are not limited to: 2,5-dimethyl-2,5-di(tert-butylperoxy)hexane, dicumyl peroxide (DCP), 1,1-di-(tert-butylperoxy)-3,3,5-trimethylcyclohexane, di-(2-tert-butyl-peroxyisopropyl)-benzene, butyl 4,4-bis(tert-butyldioxy) valerate, di-(2,4-dichlorobenzoyl)-peroxide, di-(2,4-dichlorobenzoyl)-peroxide, dibenzoyl peroxide, tert-butyl peroxybenzoate, tert-butylcumylperoxide, di-tert-butylperoxide, 2,5-dimethyl-2,5-di(tert-butylperoxy)hexyne-3, or a combination thereof.

The crosslinked polyolefin layer may have a thickness corresponding to 30-95%, particularly 40-90%, and more particularly 50-80% of the total thickness of the separator. When the thickness of the crosslinked polyolefin layer satisfies the above-defined range, it is possible to expect an effect of improving thermal stability from the crosslinked polyolefin layer. It is also possible to form a multilayer structure uniformly by ensuring a sufficient proportion of the crosslinked polyolefin layer in the separator, and to inhibit side reactions on the surface facing an electrode.

The polyolefin used for the crosslinked polyolefin layer may include polyethylene; polypropylene; polybutylene; polypentene; polyhexene; polyoctene; copolymer of at least two of ethylene, propylene, butene, pentene, 4-methylpentene, hexene and octene; or a combination thereof, and the polyolefin is crosslinked.

The polyolefin used for the non-crosslinked polyolefin layer may include polyethylene; polypropylene; polybutylene; polypentene; polyhexene; polyoctene; copolymer of at least two of ethylene, propylene, butene, pentene, 4-methylpentene, hexene and octene; or a combination thereof.

According to an embodiment of the present disclosure, the content of polypropylene may be 0.3-10 wt %, particularly 0.5-8 wt %, and more particularly 1.0-5.0 wt %, based on the total weight of the non-crosslinked polyolefin. When the content of polypropylene satisfies the above-defined range, it is possible to provide desired oxidation stability and to form pores easily through a wet process for manufacturing a separator.

According to another embodiment of the present disclosure, the non-crosslinked polyolefin layer may further include an antioxidant derivative derived from an antioxidant. The content of antioxidant introduced herein may be 500-50,000 ppm, particularly 1,000-30,000 ppm, and more particularly 1,500-20,000 ppm, based on the total content of polyolefin.

The non-crosslinked polyolefin layer may have a thickness of 0.3-2.5 m, or 0.5-2.0 m, or 0.7-1.5 μm. When the thickness of the non-crosslinked polyolefin layer satisfies the above-defined range, it is possible to improve oxidation stability under high-voltage/high-temperature environment through the introduction of the non-crosslinked polyolefin layer, and to expect battery safety through crosslinking.

The crosslinked polyolefin may have a gelling degree of 30-90%, particularly 40-85%, and more particularly 50-80%. When the gelling degree satisfies the above-defined range, it is possible to expect an effect of improving thermal stability by virtue of the crosslinked polyolefin layer and to ensure high processability.

As used herein, 'gelling degree (or crosslinking degree)' means a ratio of the number of crosslinking bonds based on the number of total structural units in a polymer.

According to the present disclosure, the gelling degree (crosslinking degree) may be calculated from the following Formula 1.

$$\text{Gelling degree (\%)} = 100 \times (B/A) \quad \text{[Formula 1]}$$

In Formula 1, A represents the weight of a crosslinked polyolefin taken from a separator including a crosslinked polyolefin layer and a non-crosslinked polyolefin layer, and B represents a dry weight of insoluble content taken by dipping a crosslinked polyolefin in 30 cm$^3$ of xylene at 105° C. for 24 hours, filtering the mixture through a 200 mesh iron net, and collecting and vacuum drying the insoluble content on the iron net.

Formula 1 provides the gelling degree of the total separator, and thus covers both the crosslinked polyolefin layer and the non-crosslinked polyolefin layer.

Therefore, in the separator according to an embodiment of the present disclosure, the gelling degree of crosslinked polyolefin may be calculated by using Formula 1 from which the gelling degree of the total separator is determined through a proportional expression considering the thickness of crosslinked polyolefin layer and that of non-crosslinked polyolefin layer, assuming that the gelling degree of non-crosslinked polyolefin is 0.

The gelling degree may be determined by the above-described method, but is not limited thereto. Any method for determining a gelling degree may be used with no particular limitation, as long as it is used conventionally in the art.

According to an embodiment of the present disclosure, the polyolefin used for forming the crosslinked polyolefin layer may have a weight average molecular weight of 50,000-5,000,000, particularly 100,000-800,000, and more particularly 150,000-350,000. Within the above-defined range, it is possible to provide a separator with desired durability and to minimize deformation of a battery during actual use of the battery, i.e. during repeated swelling/shrinking of the battery after charge/discharge.

In the lithium secondary battery according to the present disclosure, the positive electrode faces the non-crosslinked polyolefin layer of the separator. If the crosslinked polyolefin layer faces an electrode in the lithium secondary battery according to the present disclosure, the lithium secondary battery shows poor stability. This is because side reactions occur, when non-reacted radicals remaining in the crosslinked polyolefin layer after crosslinking are in direct contact with an electrode. Particularly, when the crosslinked polyolefin layer is in direct contact with the positive electrode, side reactions with non-reacted radicals occur under high voltage to cause consumption of an electrolyte and a decrease in electric potential. Such side reactions occurring due to the radicals are generated more highly under the application of electric potential. Thus, side reactions may occur highly in a positive electrode having a high electric potential, as compared to a negative electrode having a relatively low electric potential.

Therefore, according to the present disclosure, the non-crosslinked polyolefin layer faces the positive electrode side so that the crosslinked polyolefin layer may not be in direct contact with an electrode, particularly with a positive electrode, in order to solve the above-mentioned problems. According to another embodiment of the present disclosure, an outermost non-crosslinked polyolefin layer is further incorporated onto the other surface of the crosslinked polyolefin layer not facing the non-crosslinked polyolefin layer to improve the safety of a lithium secondary battery.

According to an embodiment of the present disclosure, the separator further includes an outermost non-crosslinked polyolefin layer on the other surface of the crosslinked polyolefin layer not facing the non-crosslinked polyolefin layer, and the negative electrode may face the outermost non-crosslinked polyolefin layer. This is intended to inhibit side reactions with the residual crosslinking agent (or initiator) present in the crosslinked polyolefin layer and non-reacted radicals remaining after crosslinking, when the crosslinked polyolefin layer is exposed directly to an electrode. It is possible to reduce consumption of an electrolyte and to prevent a decrease in electric potential by inhibiting side reactions caused by non-reacted radicals.

According to an embodiment of the present disclosure, the separator may further include, between the crosslinked polyolefin layer and the outermost non-crosslinked polyolefin layer, at least one layer of non-crosslinked polyolefin layer, at least one layer of crosslinked polyolefin layer, or a combination of at least one layer of non-crosslinked polyolefin layer with at least one layer of crosslinked polyolefin layer.

It is possible to indirectly prevent an electrode from being in contact with the residual crosslinking agent (or initiator) present in the crosslinked polyolefin layer and non-reacted radicals by inserting additional layers between the crosslinked polyolefin layer and the outermost non-crosslinked polyolefin layer as mentioned above. It is possible to reduce consumption of an electrolyte and to prevent a decrease in electric potential by inhibiting side reactions caused by non-reacted radicals. As a result, the lithium secondary battery according to the present disclosure shows excellent oxidation stability.

In the combination of at least one non-crosslinked polyolefin layer with at least one crosslinked polyolefin layer, the non-crosslinked polyolefin layer and the crosslinked layer may be disposed alternately or randomly, or may be disposed partially in a block shape (two or more crosslinked polyolefin layers are disposed successively, or two or more non-crosslinked polyolefin layers are disposed successively).

The method for manufacturing a lithium secondary battery according to an embodiment of the present disclosure includes the steps of: preparing a separator including a non-crosslinked polyolefin layer prepared by using polyolefin having a weight average molecular weight of 50,000-5,000,000 and a diluting agent, and a crosslinked polyolefin layer having at least one crosslinking bond represented by the following Chemical Formula 1 and prepared by using polyolefin having a weight average molecular weight of 50,000-5,000,000, a diluting agent, an initiator and a crosslinking agent; and interposing the separator between a positive electrode and a negative electrode so that the non-crosslinked polyolefin layer of the resultant separator may face the positive electrode.

According to the present disclosure, the step of preparing a separator may include preparing a non-crosslinked polyolefin layer and a crosslinked polyolefin layer, separately, and stacking them. According to an embodiment of the present disclosure, the step of preparing a separator may include preparing a composition for non-crosslinking polyolefin and a composition for crosslinking polyolefin, separately, carrying out molding and stretching of each composition, extracting a diluting agent from each composition, and forming a composite sheet. According to an embodiment of the present disclosure, the step of preparing a separator may include: preparing a composition for non-crosslinking polyolefin by using polyolefin having a weight average molecular weight of 50,000-5,000,000 and a diluting agent; preparing a composition for crosslinking polyolefin having at least one crosslinking bond represented by Chemical Formula 1 by using polyolefin having a weight average molecular weight of 50,000-5,000,000, a diluting agent, an initiator and a crosslinking agent; forming the composition for non-crosslinking polyolefin and the composition for crosslinking polyolefin into a sheet shape and stretching, to obtain a composite sheet; and extracting the diluting agent from the composite sheet to obtain a separator.

According to the present disclosure, the method includes a step of interposing the separator between the positive electrode and the negative electrode so that the non-crosslinked polyolefin layer of the separator may face the positive electrode. The method for interposing the separator between the positive electrode and the negative electrode is not particularly limited, as long as it is used conventionally in the art.

According to an embodiment of the present disclosure, the method for manufacturing a lithium secondary battery includes the steps of: preparing a composition for non-crosslinking polyolefin by using polyolefin having a weight average molecular weight of 50,000-5,000,000 and a diluting agent, and a composition for crosslinking polyolefin by using polyolefin having a weight average molecular weight of 50,000-5,000,000, a diluting agent, an initiator and a crosslinking agent; forming the composition for non-crosslinking polyolefin and the composition for crosslinking polyolefin into a sheet shape and stretching, to obtain a composite sheet; extracting the diluting agent from the composite sheet to obtain a separator; and interposing the separator between a positive electrode and a negative electrode so that the non-crosslinked polyolefin layer of the resultant separator may face the positive electrode.

According to an embodiment of the present disclosure, the lithium secondary battery including the separator may be obtained as described hereinafter, but is not limited thereto.

First, a composition for non-crosslinking polyolefin may be prepared by using polyolefin having a weight average molecular weight of 50,000-5,000,000 and a diluting agent. The composition for non-crosslinking polyolefin means a composition used for forming a polyolefin layer free from secondary process using an initiator or crosslinking agent. The non-crosslinked polyolefin layer is selected from non-modified polyolefin or modified polyolefin. The modified polyolefin includes a resin having a functional group. See, the above description about the non-crosslinked polyolefin layer.

Next, a composition for crosslinking polyolefin may be prepared by using polyolefin having a weight average molecular weight of 50,000-5,000,000, a diluting agent, an initiator and a crosslinking agent.

The diluting agent that may be used herein includes liquid or solid paraffin, wax, soybean oil, or the like.

In the polyolefin composition, the weight ratio of polyolefin:diluting agent may be 50:50-20:80, particularly 40:60-30:70.

The crosslinking agent that may be used herein includes an alkoxysilane crosslinking agent containing a carbon-carbon double bonded group.

See, the above description about the alkoxysilane crosslinking agent containing a carbon-carbon double bonded group.

The content of the crosslinking agent may be 0.1-10 parts by weight, particularly 0.1-5 parts by weight, and more particularly 0.5-2 parts by weight, based on 100 parts by weight of the total weight of polyolefin and the diluting agent.

If desired, the composition for crosslinking polyolefin may further include a crosslinking catalyst capable of accelerating crosslinking in the presence of water (i.e. aqueous crosslinking). In addition to this, the composition may optionally further include conventional additives for improving specific functions, such as an antioxidant, UV stabilizer, antistatic agent or a nucleating agent.

The crosslinking agent that may be used herein may be introduced with a time difference, and the crosslinking agents introduced in this manner may be the same or different.

According to an embodiment of the present disclosure, the composition for crosslinking polyolefin may be prepared through a single continuous process without a pretreatment step of grafting polyolefin. In this case, additional equipment is not required and high cost-efficiency and processability are provided.

As described above, a diluting agent is used in combination with polyolefin and crosslinking agent, as starting materials when preparing the composition for crosslinking polyolefin. Such a diluting agent functions as a lubricant during extrusion, and thus it is possible to carry out grafting to high-molecular weight polyolefin and extrusion.

The composition for non-crosslinking polyolefin and composition for crosslinking polyolefin obtained as described above may be formed into a sheet shape and stretching, to obtain a composite sheet.

According to an embodiment of the present disclosure, the composite sheet may be obtained by preparing a sheet by using each of the composition for non-crosslinking polyolefin and composition for crosslinking polyolefin individually and then forming a composite from the sheets, or by forming a composite simultaneously with formation of a sheet through a co-extrusion process, or the like.

According to the present disclosure, when using the co-extrusion process, the step of forming a composite sheet may include co-extruding the composition for non-crosslinking polyolefin and composition for crosslinking polyolefin to form a sheet shape and stretching, to obtain a composite sheet including a crosslinked polyolefin layer and non-crosslinked polyolefin layer, wherein the composition for crosslinking polyolefin undergoes crosslinking during the co-extrusion.

There is no particular limitation in the extrusion, forming and stretching methods, as long as they are used conventionally in the art.

Then, the diluting agent is extracted from the composite sheet to obtain a separator. The method for extracting the diluting agent is not particularly limited, as long as it is used conventionally in the art.

After that, the resultant separator is thermally fixed. The thermal fixing step is intended to remove residual stress by fixing the separator and applying heat thereto to hold the separator to be shrunk forcibly.

According to an embodiment of the present disclosure, when the polyolefin is polyethylene, the thermal fixing may be carried out at a temperature of 100-140° C., 105-135° C., or 110-130° C. When the polyolefin is polyethylene and the thermal fixing temperature satisfies the above-defined range, it is possible to carry out rearrangement of polyolefin molecules to remove residual stress of the porous film, and to solve the problem of pore blocking caused by partial melting in the film.

According to an embodiment of the present disclosure, the thermal fixing may be carried out for 10-120 seconds, 20-90 seconds, or 30-60 seconds. When the thermal fixing is carried within the above-defined time range, it is possible to carry out rearrangement of polyolefin molecules to remove residual stress of the porous film, and to solve the problem of pore blocking caused by partial melting in the film.

Then, the thermally fixed separator is subjected to aqueous crosslinking in the presence of water.

According to an embodiment of the present disclosure, the aqueous crosslinking may be carried out at a temperature of 60-100° C., 65-95° C., or 70-90° C.

According to an embodiment of the present disclosure, the aqueous crosslinking may be carried out at a humidity of 60-95% for 6-50 hours.

The separator may be interposed between the positive electrode and the negative electrode so that the non-crosslinked polyolefin layer may face the positive electrode.

In still another aspect of the present disclosure, there is provided the separator as described hereinafter.

Particularly, the separator is a separator for a lithium secondary battery including a positive electrode and a negative electrode, wherein the separator is interposed between the positive electrode and the negative electrode, and the separator includes: a non-crosslinked polyolefin layer; and a crosslinked polyolefin layer disposed on one surface of the non-crosslinked polyolefin layer and having at least one crosslinking bond represented by the following Chemical Formula 1, and the positive electrode faces the non-crosslinked polyolefin layer of the separator;

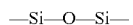   [Chemical Formula 1]

In the separator, the non-crosslinked polyolefin layer and the crosslinked polyolefin layer are the same as described above.

According to an embodiment of the present disclosure, the separator further includes an outermost non-crosslinked polyolefin layer on the other surface of the crosslinked polyolefin layer not facing the non-crosslinked polyolefin layer, wherein the negative electrode faces the outermost non-crosslinked polyolefin layer.

The positive electrode and the negative electrode may be obtained by allowing each of the electrode active materials to be bound to a current collector through a method generally known in the art. Non-limiting examples of a positive electrode active material include conventional positive electrode active materials that may be used for the positive electrodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of a negative electrode active material include conventional negative electrode active materials that may be used for the negative electrodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a positive electrode current collector include foil made of aluminum, nickel or a combination thereof. Non-limiting examples of a negative electrode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

(1) Manufacture of Separator

To prepare a composition for crosslinking polyolefin, high-density polyethylene having a weight average molecular weight of 300,000 was used as polyolefin and liquid paraffin oil was used as a diluting agent. The high-density polyethylene had a melting point of 135° C. and the liquid paraffin oil had a dynamic viscosity of 40 cSt at 40° C.

The high-density polyethylene and liquid paraffin oil were used at a weight ratio of 35:65. Vinyltriethoxysilane was used as an alkoxysilane containing a carbon-carbon double bonded group. The content of vinyltriethoxysilane was 2 parts by weight based on 100 parts by weight of the combined weight of high-density polyethylene and liquid paraffin oil. As an initiator, 2,5-dimethyl-2,5-di(tert-butylperoxy)hexane was added in an amount of 2 parts by weight based on 100 parts by weight of vinyltriethoxysilane. The above-mentioned ingredients were introduced to a biaxial extruder having an L/D ratio of 56 and kneaded therein to obtain a polyethylene composition, while the composition was subjected to reactive extrusion at a temperature of 200° C. at the same time. In this manner, a silane-grafted polyethylene composition A was obtained.

A non-crosslinked polyolefin composition B was prepared in the same manner as the composition for crosslinking polyolefin, except that vinyltriethoxysilane and the initiator were not used to prepare a non-crosslinked polyolefin composition.

The composition for non-crosslinking polyolefin and the composition for crosslinking polyolefin were co-extruded to produce A/B-type (crosslinked polyolefin layer/non-crosslinked polyolefin layer) flow in the manifold and to form a sheet shape through a die and cooling casting roll. Then, the resultant sheet was biaxially stretched with a tenter type two-step stretching machine carrying out stretch in the machine direction (MD) and then stretch in the transverse direction (TD) to obtain a composite sheet. Herein, both the MD stretch ratio and the TD stretch ratio were 5.5. The stretching temperature was 108° C. in MD and 123° C. in TD.

Then, liquid paraffin oil was extracted with methylene chloride from the resultant composite sheet and thermal fixing was carried out at 127° C. to obtain a porous film. The resultant porous film was subjected to aqueous crosslinking in a constant temperature/constant humidity chamber at 80° C. and a humidity of 90% for 24 hours. In this manner, a separator, including a non-crosslinked polyolefin layer, and a crosslinked polyolefin layer disposed on one surface of the non-crosslinked polyolefin layer and having at least one —Si—O—Si— crosslinking bond, was obtained.

Herein, the crosslinked polyolefin layer had a thickness of 8.0 μm and the non-crosslinked polyolefin layer had a thickness of 1.0 μm. In addition, the separator had a gelling degree of 63% as a whole, wherein the gelling degree of the crosslinked polyolefin was 71%, assuming that the gelling degree of the non-crosslinked polyolefin was 0.

The separator had a melt-down temperature of 192° C., which is preferred.

(2) Manufacture of Lithium Secondary Battery

1) Manufacture of Negative Electrode

Artificial graphite as a negative electrode active material, carbon black as a conductive material, carboxymethyl cellulose (CMC) as a dispersing agent and a binder (BM-L301 available from Zeon Ltd.) were mixed with water at a weight ratio of 95.8:1:1.2:2 to obtain negative electrode slurry. The negative electrode slurry was coated on copper (Cu) foil to a thickness of 50 μm to form a thin electrode plate, which, in turn, was dried at 135° C. for 3 hours more and pressed, thereby providing a negative electrode.

2) Manufacture of Positive Electrode $LiCoO_2$ as a positive electrode active material, carbon black as a conductive material and polyvinylidene fluoride (PVDF) as a binder were mixed with N-methyl-2-pyrrolidone (NMP) at a weight ratio of 98:1:1 to obtain positive electrode slurry. The positive electrode slurry was coated on aluminum foil to a thickness of 50 μm to form a thin electrode plate, which, in turn, was dried at 135° C. for 3 hours more and pressed, thereby providing a positive electrode.

3) Manufacture of Lithium Secondary Battery

Then, the separator was interposed between the negative electrode and the positive electrode so that the non-crosslinked polyolefin layer faced the positive electrode, and the resultant structure was wound to provide a jelly-roll type electrode assembly. The electrode assembly was inserted to a cylindrical casing and an electrolyte containing 1M $LiPF_6$ dissolved in a solvent including ethylene carbonate (EC) and diethyl carbonate (DEC) at a volume ratio of 50:50 was injected thereto to obtain a lithium secondary battery.

Example 2

A lithium secondary battery was obtained by inserting a separator between a negative electrode and a positive electrode in the same manner as Example 1, except that the separator was manufactured by forming a B/A/B-type (non-crosslinked polyolefin layer/crosslinked polyolefin layer/non-crosslinked polyolefin layer) composite sheet in the manifold during the co-extrusion.

Herein, the crosslinked polyolefin layer had a thickness of 7.0 μm and the non-crosslinked polyolefin layer had a thickness of 1.0 μm. In addition, the separator had a gelling degree of 56% as a whole, wherein the gelling degree of the crosslinked polyolefin was 72%, assuming that the gelling degree of the non-crosslinked polyolefin was 0.

The separator had a melt-down temperature of 188° C., which is preferred.

Example 3

A lithium secondary battery was obtained in the same manner as Example 1, except that high-density polyethylene and polypropylene were introduced to prepare a non-crosslinked polyolefin composition at a weight ratio of high-density polyethylene and polypropylene of 97:3.

Herein, the crosslinked polyolefin layer had a thickness of 8.0 μm and the non-crosslinked polyolefin layer had a thickness of 1.0 μm. In addition, the separator had a gelling degree of 63% as a whole, wherein the gelling degree of the crosslinked polyolefin was 71%, assuming that the gelling degree of the non-crosslinked polyolefin was 0.

The separator had a melt-down temperature of 193° C., which is preferred.

Example 4

A lithium secondary battery was obtained in the same manner as Example 1, except that high-density polyethylene was introduced to prepare a non-crosslinked polyolefin composition, and a primary antioxidant (Irganox 1010) and a secondary antioxidant (Irganox 168) were mixed with high-density polyethylene at a concentration of 5000 ppm and 3000 ppm, respectively, based on the weight of polyethylene.

Herein, the crosslinked polyolefin layer had a thickness of 8.0 μm and the non-crosslinked polyolefin layer had a thickness of 1.0 μm. In addition, the separator had a gelling degree of 60% as a whole, wherein the gelling degree of the crosslinked polyolefin was 68%, assuming that the gelling degree of the non-crosslinked polyolefin was 0.

The separator had a melt-down temperature of 190° C., which is preferred.

Comparative Example 1

A separator and lithium secondary battery were obtained in the same manner as Example 1, except that a separator including a crosslinked polyolefin layer alone without a non-crosslinked polyolefin layer was obtained. Herein, the crosslinked polyolefin layer had a thickness of 9.0 μm and the crosslinked polyolefin had a gelling degree of 71%.

The separator had a melt-down temperature of 193° C.

Comparative Example 2

A separator was obtained in the same manner as Example 1, except that the separator was interposed between the positive electrode and the negative electrode so that the non-crosslinked polyolefin layer faced the negative electrode to form a jelly-roll type electrode assembly, the electrode assembly was inserted to a cylindrical casing and an electrolyte was injected thereto. The separator had the same characteristics as described in Example 1.

Comparative Example 3

A lithium secondary battery were obtained in the same manner as Example 1, except that a A/B/A-type (crosslinked polyolefin layer/non-crosslinked polyolefin layer/crosslinked polyolefin layer) composite sheet was formed in the manifold during the co-extrusion to provide a separator, and the separator was interposed between the negative electrode and the positive electrode.

Herein, the crosslinked polyolefin layer had a thickness of 7.0 μm and the non-crosslinked polyolefin layer had a thickness of 1.0 μm. In addition, the separator had a gelling degree of 16% as a whole, wherein the gelling degree of the crosslinked polyolefin was 72%, assuming that the gelling degree of the non-crosslinked polyolefin was 0.

The separator had a melt-down temperature of 172° C.

Comparative Example 4

A lithium secondary battery was obtained in the same manner as Example 1, except that a separator obtained as described hereinafter was used.

To obtain a separator, a crosslinked polyolefin composition A and non-crosslinked polyolefin composition B were prepared as follows. Particularly, the crosslinked polyolefin composition A was prepared by using high-density polyethylene having a weight average molecular weight less than 300,000 as polyolefin, introducing liquid paraffin oil at a weight ratio of 35:65 as a diluting agent, using no vinyltriethoxysilane, and introducing 2,5-dimethyl-2,5-di(tert-butylperoxy)hexane in an amount of 2.4 parts by weight based on 100 parts by weight of the combined weight of polyolefin and liquid paraffin oil.

A non-crosslinked polyolefin composition B was prepared in the same manner as the crosslinked polyolefin composition A, except that 2,5-dimethyl-2,5-di(tert-butylperoxy) hexane was not used.

The composition for non-crosslinking polyolefin and the composition for crosslinking polyolefin were co-extruded to produce A/B-type (crosslinked polyolefin layer/non-crosslinked polyolefin layer) flow in the manifold and to form a sheet shape through a die and cooling casting roll. Then, the resultant sheet was biaxially stretched with a tenter type two-step stretch machine carrying out stretch in the machine direction (MD) and then stretch in the transverse direction (TD) to obtain a composite sheet. Herein, both the MD stretch ratio and the TD stretch ratio were 5.5. The stretching temperature was 108° C. in MD and 123° C. in TD.

Then, liquid paraffin oil was extracted with methylene chloride from the resultant composite sheet and thermal fixing was carried out at 127° C. to obtain a porous film. Unlike Example 1, crosslinking was not carried out in a constant temperature/constant humidity chamber.

In this manner, a separator, including a non-crosslinked polyolefin layer, and a crosslinked polyolefin layer disposed on one surface of the non-crosslinked polyolefin layer and having at least one silane crosslinking bond, was obtained.

Herein, the crosslinked polyolefin layer had a thickness of 8.0 µm and the non-crosslinked polyolefin layer had a thickness of 1.0 µm. In addition, the separator had a gelling degree of 61% as a whole, wherein the gelling degree of the crosslinked polyolefin was 69%, assuming that the gelling degree of the non-crosslinked polyolefin was 0.

The separator had a melt-down temperature of 149° C. Thus, no effect of increasing a melt-down temperature was shown by the crosslinking.

Comparative Example 5

A separator was obtained in the same manner as Comparative Example 1, except that the initiator and alkoxysilane containing a carbon-carbon double bonded group were not introduced. Then, a crosslinked separator was obtained through electron beam crosslinking (i.e. electron beam irradiation) instead of chemical crosslinking. Herein, the electron beam dose was 10 kGy/pass and 3 passes of irradiation were carried out.

The resultant separator had a melt-down temperature of 143° C., which is lower than the melt-down temperature of non-crosslinked polyolefin.

Test Example

Each of the lithium secondary batteries according to Examples 1-4 and Comparative Examples 1-3 was determined for open circuit voltage (OCV) with time, while being stored at 4.45V and 72° C. The results are shown in the following Table 1.

TABLE 1

|  | Initial (V) | After 24 hrs. (V) | After 48 hrs. (V) | After 72 hrs. (V) | After 96 hrs. (V) |
| --- | --- | --- | --- | --- | --- |
| Ex. 1 | 4.436 | 4.418 (−0.018) | 4.408 (−0.010) | 4.399 (−0.009) | 4.392 (−0.007) |
| Ex. 2 | 4.435 | 4.420 (−0.015) | 4.409 (−0.011) | 4.400 (−0.009) | 4.393 (−0.007) |
| Ex. 3 | 4.436 | 4.419 (−0.017) | 4.436 (−0.009) | 4.419 (−0.009) | 4.436 (−0.006) |
| Ex. 4 | 4.436 | 4.420 (−0.016) | 4.436 (−0.010) | 4.420 (−0.009) | 4.436 (−0.007) |
| Comp. Ex. 1 | 4.436 | 4.416 (−0.020) | 4.398 (−0.018) | 4.107 (−0.291) | 3.611 (−0.496) |
| Comp. Ex. 2 | 4.435 | 4.416 (−0.019) | 4.399 (−0.017) | 4.094 (−0.305) | 3.367 (−0.727) |
| Comp. Ex. 3 | 4.435 | 4.415 (−0.020) | 4.399 (−0.016) | 4.097 (−0.302) | 3.359 (−0.738) |

While Examples 1 and 2 shows stabilization of a drop in OCV after 24 hours, Comparative Examples 1 and 2 shows a rapid drop in voltage after 72 hours. The shape of the separator of the cell disassembled after 72 hours under the condition of Comparative Example 1 is shown in FIG. 1. It can be estimated that chain reaction occurs starting from a specific site. Particularly, as can be seen from FIG. 1, a structure extending like dendrite appears. It is thought that the structure results from the side reaction between non-reacted radicals present in the crosslinked polyolefin layer and the positive electrode surface.

Figure 2:
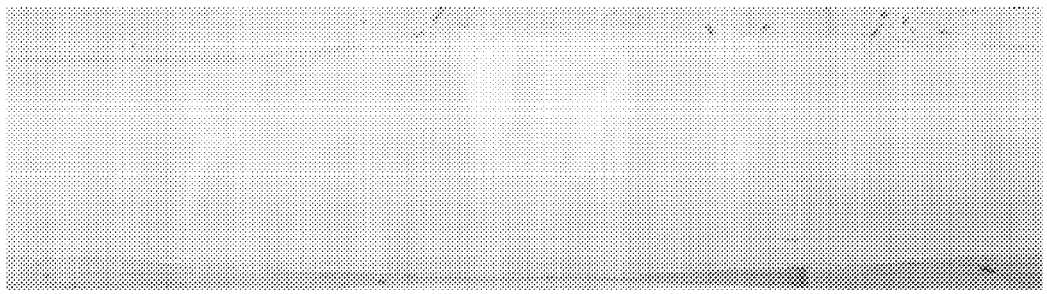
FIG. 2 is a photographic image illustrating a portion of the separator according to Example 1, facing the positive electrode, after it is stored at 72° C./4.45 V for 72 hours and then disassembled.

On the contrary, as can be seen from FIG. 2, Example 1 in which the crosslinked polyolefin layer is not in direct contact with the positive electrode surface causes no such side reaction. FIG. 2 is a photographic image illustrating a portion of the separator according to Example 1, facing the positive electrode, after the battery is disassembled after being stored at 4.45V and 72° C. for 72 hours.

Meanwhile, according to the present disclosure, the melt-down temperature is determined through thermomechanical analysis (TMA), after taking a sample from a porous film in the machine direction (MD) and transverse direction (TD). Particularly, a sample having a length of 10 mm is introduced to a TMA instrument (TA instrument, Q400) and is exposed to a temperature-increasing condition (temperature is increased at a rate of 5° C./min. from 30° C.) under the application of tension of 19.6 mN. As the temperature is increased, the sample undergoes a change in length. Then, the temperature at which point the sample undergoes a rapid increase in length and is broken is measured. Such temperature is measured both in MD and TD and higher temperature is defined as 'melt-down temperature'.

Meanwhile, when the alkoxysilane containing a carbon-carbon double bonded group is not used and aqueous crosslinking is not performed, like Comparative Example 4, melt-down temperature is low. Thus, it is not possible to obtain a desired level of melt down temperature according to the present disclosure.

In addition, when electron beam crosslinking is carried out, like Comparative Example 5, melt-down temperature is low. Thus, it is not possible to obtain a desired level of melt down temperature according to the present disclosure.

What is claimed is:

1. A lithium secondary battery, comprising:
a positive electrode;
a negative electrode; and
a separator interposed between the positive electrode and the negative electrode,
wherein the separator comprises a non-crosslinked polyolefin layer facing the positive electrode, and a crosslinked polyolefin layer disposed on one surface of the non-crosslinked polyolefin layer and having at least one crosslinking bond represented by the following Chemical Formula 1, and an outermost non-crosslinked polyolefin layer on a surface of the crosslinked polyolefin layer such that the crosslinked polyolefin layer is interposed between the non-crosslinked polyolefin layer and the outermost non-crosslinked polyolefin layer, wherein the outermost non-crosslinked polyolefin layer faces the negative electrode,
wherein the non-crosslinked polyolefin layer comprises a combination of polyethylene and polypropylene:

—Si—O—Si—  [Chemical Formula 1].

2. The lithium secondary battery according to claim 1, further comprising:
at least one additional layer interposed between the crosslinked polyolefin layer and the outermost non-crosslinked polyolefin layer, wherein the at least one additional layer is selected from the group consisting of a non-crosslinked polyolefin layer, a crosslinked polyolefin layer, or a combination thereof.

3. The lithium secondary battery according to claim 1, wherein the crosslinking bond is derived from an alkoxysilane containing a carbon-carbon double bonded group.

4. The lithium secondary battery according to claim 1, wherein the crosslinked polyolefin layer has a thickness corresponding to 30-95% of the total thickness of the separator.

5. The lithium secondary battery according to claim 1, wherein the non-crosslinked polyolefin layer has a thickness of 0.3-2.5 μm.

6. The lithium secondary battery according to claim 1, wherein the content of polypropylene is 0.3-10 wt % based on the total weight of the non-crosslinked polyolefin layer.

7. The lithium secondary battery according to claim 1, wherein the non-crosslinked polyolefin layer further comprises an antioxidant derivative derived from an antioxidant.

8. The lithium secondary battery according to claim 1, wherein the crosslinked polyolefin in the crosslinked polyolefin layer has a gelling degree of 30-90%.

9. The lithium secondary battery according to claim 1, which has an open-circuit voltage of 4.25V or more, when it is charged with 4.45V and then stored at 72° C. for 96 hours.

10. A separator for a lithium secondary battery, comprising:
a non-crosslinked polyolefin layer configured to face a positive electrode of a lithium secondary battery;
a crosslinked polyolefin layer disposed on one surface of the non-crosslinked polyolefin layer and having at least one crosslinking bond represented by the following Chemical Formula 1; and
an outermost non-crosslinked polyolefin layer on a surface of the crosslinked polyolefin layer such that the crosslinked polyolefin layer is interposed between the non-crosslinked polyolefin layer and the outermost non-crosslinked polyolefin layer, wherein the outermost non-crosslinked polyolefin layer is configured to face a negative electrode of a lithium secondary battery,
wherein the non-crosslinked polyolefin layer comprises a combination of polyethylene and polypropylene:

—Si—O—Si—  [Chemical Formula 1].

* * * * *